July 31, 1962     T. A. O. GROSS     3,047,040
PNEUMATIC LOAD BEARING DEVICES
Filed Jan. 25, 1960     2 Sheets-Sheet 1

INVENTOR.
THOMAS A. O. GROSS
BY

ATTORNEYS

July 31, 1962 T. A. O. GROSS 3,047,040
PNEUMATIC LOAD BEARING DEVICES
Filed Jan. 25, 1960 2 Sheets-Sheet 2

INVENTOR.
THOMAS A. O. GROSS
BY
*Kenway, Jenney & Hildreth*

ATTORNEYS

3,047,040
PNEUMATIC LOAD BEARING DEVICES
Thomas A. O. Gross, Concord Road, Lincoln, Mass.
Filed Jan. 25, 1950, Ser. No. 4,314
4 Claims. (Cl. 152—330)

This invention relates to pneumatic load bearing devices such as pneumatic tires and pneumatic springs which depend upon the pressure of a gas to provide a yielding support for a load.

Such devices are commonly used to isolate loads from shocks or sudden displacements. They have proved quite effective for this purpose because of the pressure-volume relationship of the gas, which is most commonly air, although carbon dioxide and a few other common gases have also been used. The cushioning effect provided by pneumatic load bearing devices arises at least in part from the compression of the gas accompanying a decrease in volume, and the degree of cushioning will be seen to be dependent upon the pressure rise accompanying a given volume change.

The invention is particularly useful in the springs in vehicular systems, as in passenger automobiles, where load support must be provided under widely varying rates of loading. The springs must accordingly provide static support for the vehicle, and must also respond under both low and high rates of loading varying from the slow compression accompanying the rolling on a turn or driving over a smoothly undulating roadway to the more rapid rates encountered in driving over bumpy roads, grade crossings, and the like. A particularly objectionable type of bump is one of intermediate frequency, e.g. from 15-200 cycles per minute, since such is likely to be of relatively high amplitude, and is readily sensed by the passengers. In one aspect, this invention provides a pneumatic spring having improved softness at these and higher frequencies.

Suspension systems for automotive vehicles have been developed utilizing both metal and pneumatic springs or combinations of metal and pneumatic systems. Pneumatic systems have advantages over metal systems in being easily adjusted to provide various load carrying capacity and to control the elevation of the vehicle, since the pressure may be readily and automatically controlled for the particular load or elevation. They may also be adjusted individually to level the vehicle when one side or end is heavily loaded. Metal springs are more difficult to control in this manner but are advantageous in providing softer support of the vehicle under rapidly applied loads in comparison with the static load bearing characteristics. Under rapid loading conditions or at oscillation rates of high frequency, pneumatic springs are stiffer than under static conditions, because the temperature rise that accompanies compression is not dissipated as it is under static substantially isothermal conditions.

The object of the present invention is to provide a pneumatic load bearing device of increased softness to sudden displacements by which shocks creating suddenly increased load forces are better absorbed. The invention as applied to vehicle tires provides a smoother ride, and as applied to pneumatic springs, provides greater compliance to sudden jolts, than has heretofore been realized.

The invention consists in general of utilizing as the inflating medium gases having large complex molecules with large and easily excited spin and/or torsional moments, such gases being generally halogen-carbon compounds and other halide gases, particularly fluorides. It has been found that such gases, when subjected to a sudden compressive force, permit much greater volume changes for a given pressure rise than do gases heretofore used. Stated conversely, such gases show a smaller pressure rise for a given volume change.

An investigation of the behavior of these gases and the condition of them under suddenly applied loads, reveals that the physical constant expressive of the combined qualities of molecular degrees of freedom and other dimensions rendering pressure changes less responsive to volume changes is the ratio of specific heat at constant pressure, $Cp$, to specific heat at constant volume, $Cv$, the ratio being generally designated by the symbol $\gamma$. The improved results I have discovered are best achieved with gases having a $\gamma$ of less than about 1.25. Representative gases having a low $\gamma$ are the following:

| Low Gas Compounds | Formula | $Cp/Cv$, $\gamma$, 1 Atm. |
|---|---|---|
| Chlorotrifluoromethane | $CClF_3$ | 1.17 at 30° C. |
| Methyl fluoride | $CH_3F$ | |
| Tetrafluoromethane | $CF_4$ | 1.22 at −80° C. |
| Perfluoroethane | $CF_3$—$CF_3$ | 1.09 at 30° C. |
| Trifluoromethane | $CHF_3$ | |
| Sulfurhexafluoride | $SF_6$ | 1.09 at 30° C. |
| Borontrifluoride | $BF_3$ | |
| Monobromotrifluoromethane | $CBrF_3$ | 1.14 at 30° C. |

Accordingly, the invention may be embodied in pneumatic springs, tires, and similar devices by inflating them with a gas having a $\gamma$ of less than 1.25, for instance with sulfur hexafluoride, hexafluoroethane, or other low gamma gas having a vapor pressure in excess of the inflation pressure at operating temperatures. Conventional pneumatic load bearing systems designed for use with air may be used in this invention without structural modification, by removing the air and replacing it with the low gamma gas under the same static pressure.

The effect of such inflation has been tested in tires and found to be demonstrable in giving a noticeably smoother ride on rough surfaces without resulting in the adverse effects of under-inflation of the tires. The tires are inflated to the recommended static pressure, e.g. 26 p.s.i.g. The effects of using a low $\gamma$ gas are realized under compression conditions during which these gases undergo a greater volume change for a given pressure increase, or, conversely, show a lower pressure rise for a given volume change.

The reason for this behavior is believed to lie in the fact that sudden compressions of this sort are substantially adiabatic, that is to say that there is no heat exchange to or from the gas. The temperature rise that accompanies compression is accordingly not compensated by loss of heat to the surroundings, and serves to resist the pressure increase. With a low $\gamma$ gas, the temperature rise is less than with a gas having a higher $\gamma$ and the low $\gamma$ gas is accordingly more compressible under adiabatic conditions. The relationship can be readily appreciated from the classical formula for the pressure-volume relationship of gases under adiabatic conditions.

$$P_1 = P_0 \left[\frac{V_0}{V_1}\right]^\gamma$$

where $P_0$ = an initial pressure
$V_0$ = an initial volume,
$V_1$ = a final volume,
$P_1$ = a final pressure, and
$\gamma$ = the ratio of specific heat at constant pressure to specific heat at constant volume.

From the foregoing it will be seen that under the substantially adiabatic conditions which are seen to prevail in pressure-volume changes occurring in a pneumatic tire in actual use on rough surfaces, increased compliance of the inflating gas to external shocks will be realized while the static inflating pressure is the same as when air is used for inflation.

Sulfur hexafluoride is particularly useful as a low $\gamma$ inflating medium, since it has a high vapor pressure (5 atm. at $-30°$ C.), is extremely inert to rubber, and has a $\gamma$ value of 1.09 at 30° C. Other gases such as $C_2F_6$ and $CF_3Br$ and other fluorine-carbon compounds may also be used. Some of these, such as $CCl_2F_2$ have a tendency to attack rubber, but this effect can be avoided by incorporating a liner of a material that is not attacked by the gas as a barrier between the gas and tire.

Suitable barrier materials include polyethylene, plasticized vinyl chloride, polyvinyl alcohol, polymerized tetrafluoroethylene and other flexible plastic materials which are inert and impervious to such gases. The recent advent of so-called tubeless tires, which are inflated directly without the use of an inner tube, provides a particularly convenient means of incorporating a liner which may be a separate preformed structure lying in contact with the inner surface of the tire, or may be a coating of the barrier material applied to the inner surface of the tire. Inasmuch as the art in this field is well developed it is not seen that a description of the details involved in providing a suitable liner will in any way enhance an understanding of the invention.

A gas suitable for a particular system should be one that does not condense at the temperatures and pressures encountered in the system. If condensation occurs, the capacity to accommodate increased loading is lost substantially because the pressure of a condensible vapor in equilibrium with its liquid phase is a function of the temperature and does not follow the pressure volume relationship of a true gas. Thus, under static conditions, a condensible vapor provides extremely soft support, since any increased loading causes condensation to occur until the temperature is raised to where the vapor pressure equals the increased loading. Moreover at high rates of loading, the support provided by a condensible gas stiffens markedly because the rate at which condensation may occur is limited to the rate at which the vapor changes to condensate. Thus, whereas at rapid rates of loading a low gamma gas provides softer dynamic support relative to its static load bearing support than a high gamma gas, a vapor of low gamma at rapid rates of loading is of increased stiffness relative to its static load bearing support, and provides impractically soft support under static conditions because of vapor condensation.

A graphical comparison of the various systems is illustrated in the drawings wherein.

The characteristics of a metal spring, as shown by FIG. 1a, are largely independent of the rate of loading since, unlike gases the force applied causes a deflection dependent only on the spring constant, which for purely elastic loading does not vary greatly with the rate of loading. With gases however, the temperature rise accompanying compression introduces a factor affecting the pressure-volume relationship. As shown by FIG. 1b, a pneumatic spring inflated with a high gamma gas such as air and designed for the same static compliances as the metal spring of FIG. 1a deflects less than the metal spring when the same load is applied rapidly. With a low gamma gas however the same spring inflated to the same static pressure offers compliance approaching that of the metal spring under a rapidly applied load. The invention thus introduces the advantageous features of the metal spring into the pneumatic springs without sacrificing their desirable aspects, as illustrated in FIG. 1c.

Figure 2:
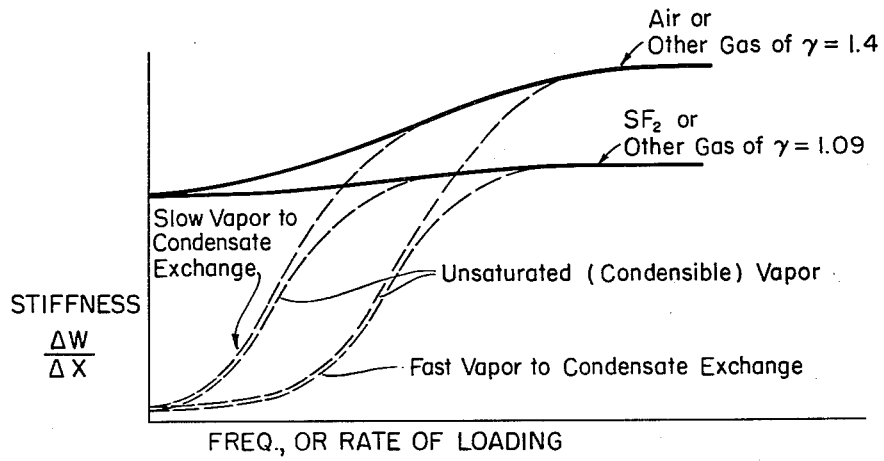
FIG. 2 is a graph showing the relationships between stiffness and rate of loading (frequency) of both high gamma and low gamma gases and condensible vapors.

The graph in FIG. 2 also illustrates that the same spring, inflated with air to a given static stiffness, becomes stiffer at higher frequencies or rates of loading than when the same spring is inflated to the same static stiffness with sulfur hexafluoride or other low gamma gas.

Figure 1:
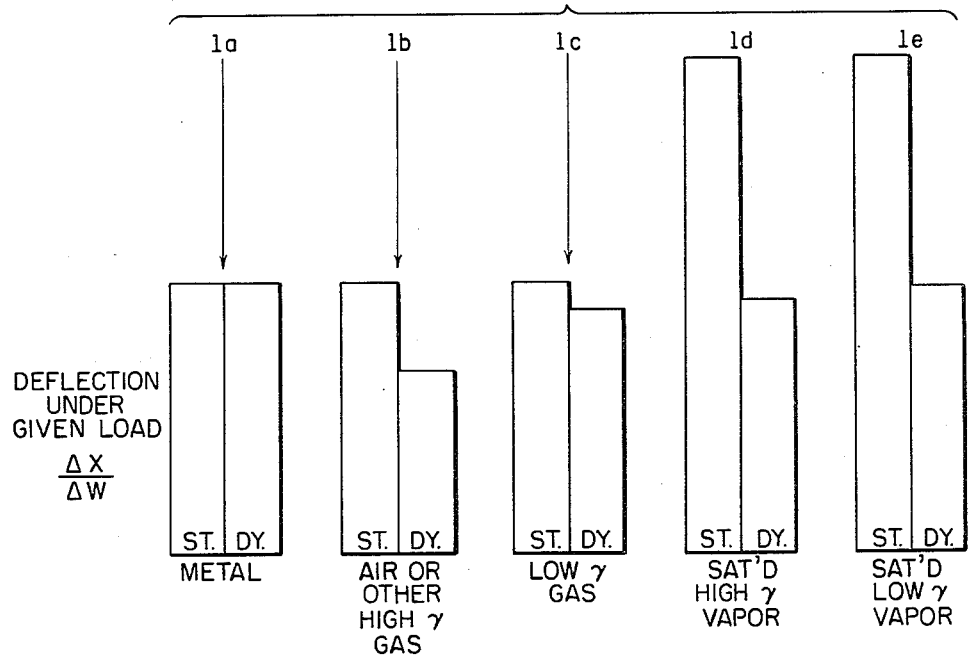
FIG. 1 is a series of bar graphs showing the static and dynamic deflection of various types of suspension systems under both static and dynamic loading.

The behavior of a spring inflated with a saturated vapor is also shown in FIGS. 1 and 2. Since loading to an increased pressure causes condensation of the vapor, the stiffness is quite low under static conditions and under low rates of loading as shown by FIG. 2; the deflection from a given load is correspondingly high as shown in FIGS. 1d and 1e. At higher rates of loading, approaching the limit of the rate at which vapor-to-condensate exchange can take place, the stiffness and deflection of a saturated vapor inflated spring approaches that of a gas. The net result is an exaggerated increase in stiffness at high rates of loading, which is avoided by using low gamma gases.

Figure 3:
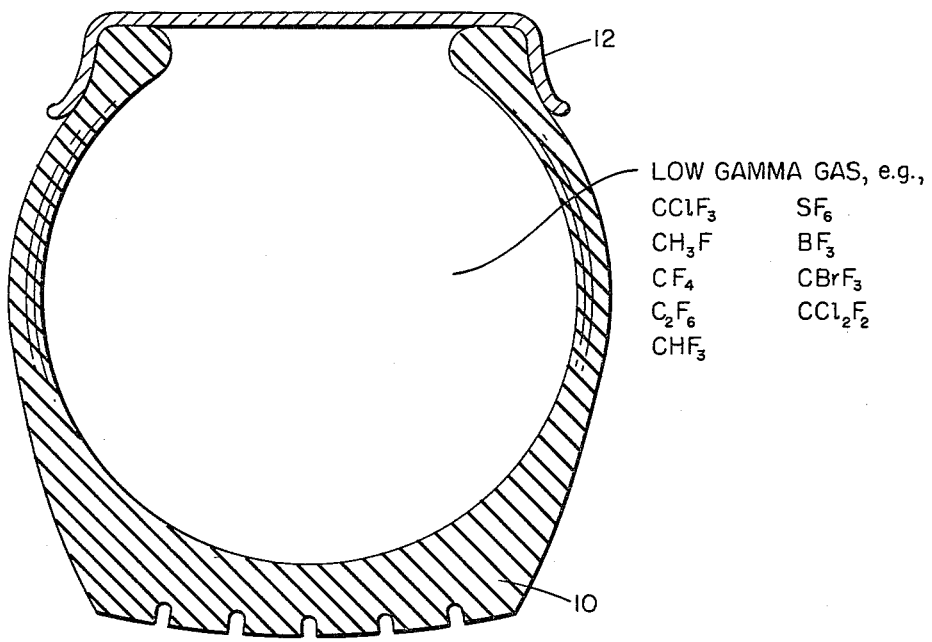
FIG. 3 illustrates the invention as embodied in a vehicle tire which is shown schematically in cross section.

In FIG. 3 a pneumatic tire is shown as a representative embodiment of this invention. The casing 10 and rim 12 are of conventional construction and of themselves form no part of this invention. As indicated by the legend, the tire is inflated with a low gamma gas, which may be any of those described above.

From the foregoing, it will be appreciated that my invention presents a substantial improvement in the general field of pneumatic load bearing devices, and that it has wide applicability throughout that field. It is accordingly contemplated that applications differing from the preferred representative embodiments of the invention described herein will readily occur to those skilled in the art and that such do not represent a departure from the scope of this invention.

This application is a continuation-in-part of my application, Serial No. 557,985, filed January 9, 1956, now abandoned.

Having thus disclosed my invention and described in detail preferred embodiments thereof, I claim and desire to secure by Letters Patent:

1. A pneumatic yieldable load bearing device comprising an enclosed container having wall portions movable and effective to vary the volume of the container, said portions supporting a load tending to move said portions, and a gas within said container, said gas being under a pressure effective to support said load and having a ratio of $Cp/Cv$ of no more than about 1.25 and being uncondensible at temperatures and pressures within the container encountered during normal operation of the device.

2. A pneumatic yieldable load bearing device comprising an enclosed container having wall portions movable and effective to vary the volume of the container, said portions supporting a load tending to move said portions, and a gas having a ratio of $Cp/Cv$ of no more than 1.25 within said container selected from the group consisting of $CClF_3$, $CH_3F$, $CF_4$, $C_2F_6$, $CHF_3$, $SF_6$, $BF_3$, $CBrF_3$, and $CCl_2F_2$, said gas being under a pressure effective to support said load and being uncondensible at temperatures and pressures within the container encountered during normal operation of the device.

3. A pneumatic vehicle tire inflated with a gas having a ratio of $Cp/Cv$ of no more than 1.25 and said gas being uncondensible at temperatures and pressures within the container encountered during normal operation of the device.

4. A pneumatic spring comprising a vessel having movable wall portions effective to vary the volume of the vessel and to support a load tending to move said portions, and an inflating medium within said vessel comprising a gas under a pressure effective to support said load and having a ratio of $Cp/Cv$ of no more than 1.25 and being uncondensible at temperatures and pressures within the container encountered during normal operation of the device.

(References on following page)

References Cited in the file of this patent

UNITED STATES PATENTS

| | | |
|---|---|---|
| 1,637,599 | Ballew | Aug. 2, 1927 |
| 2,611,607 | Needy | Sept. 23, 1952 |
| 2,742,321 | Mina et al. | Apr. 17, 1956 |
| 2,805,854 | Gaebler | Sept. 10, 1957 |
| 2,950,751 | Bolster et al. | Aug. 30, 1960 |
| 2,959,325 | Beard | Nov. 8, 1960 |

FOREIGN PATENTS

| | | |
|---|---|---|
| 955,081 | France | Nov. 4, 1947 |

UNITED STATES PATENT OFFICE

CERTIFICATE OF CORRECTION

Patent No. 3,047,040　　　　　　　　　　　　　　July 31, 1962

Thomas A. O. Gross

It is hereby certified that error appears in the above numbered patent requiring correction and that the said Letters Patent should read as corrected below.

Column 4, line 1, strike out "Numerous of the gases listed in Table I may be used." and insert the same before "Sulfur hexafluoride" in line 1, column 3, as the beginning of a new paragraph.

Signed and sealed this 18th day of December 1962.

(SEAL)
Attest:

ERNEST W. SWIDER
Attesting Officer

DAVID L. LADD
Commissioner of Patents